Patented Aug. 12, 1952

2,606,840

UNITED STATES PATENT OFFICE 2,606,840

PROCESS FOR PRESERVING FRESH CORN

Edgar T. Boisvert, Wethersfield, Conn.

No Drawing. Application January 26, 1950,
Serial No. 140,759

6 Claims. (Cl. 99—154)

This invention relates to a process for preserving fresh corn and the product resulting therefrom and, more particularly, to a process for roasting fresh sweet corn on the cob and preserving the same by freezing and the product resulting therefrom.

Attempts have previously been made to preserve fresh sweet corn on the cob by freezing the same, but the products resulting from such previously used methods have not met with any extensive favorable acceptance by consumers for a number of reasons. One reason is that the flavor of the kernels of corn when eaten is contaminated by flavor absorbed from the vegetable stalk or corn cob, whereby the product has what is known as a "cobby" flavor. Another reason is that when such corn is prepared for eating, the kernels are soggy and, in some instances, shrunken, whereby they are much less palatable than corn prepared in fresh condition shortly after being picked from the stalk.

It is an object of the present invention to provide a highly palatable product comprising fresh sweet corn which has been picked at the height of its ripeness and immediately roasted and otherwise prepared in accordance with the present invention, and then frozen, the product retaining substantially all of the natural flavor of freshly roasted corn uncontaminated by flavor from the stalk or cob of the corn.

It is another object of the invention to provide a roasted fresh corn product preserved by freezing and which, when prepared for eating, retains not only the natural flavor of freshly roasted corn, but is also crisp and unshrunken so as to be substantially similar to freshly roasted ripe corn, regardless of whether the roasted corn is preserved while remaining on the cob or cut therefrom as separated kernels.

Sweet corn remains in fully ripened condition and at the height of its natural flavor only for several days. After this, the milk of the corn and the natural sugar therein is converted by natural processes into starch. Thus, corn is at its best flavor when picked from the stalk during the several days referred to above and said corn is at its greatest sweetness when eaten within a very short interval of time following the picking thereof.

In accordance with the present invention, sweet corn is picked during said several days when it is at the height of its natural sweet flavor and the picked ears of corn are promptly prepared as follows.

Both ends of the ears of corn are trimmed transversely to the ears so as to expose the opposite ends of the cob of the ear, the interior of the cob also preferably being exposed. In the preferred embodiment of the invention, some of the outer leaves of the husk are removed but about three layers of the husk leaves are retained on the ears when trimmed as aforesaid at the ends, the retained layers of husk leaves enclosing the kernels on each ear of corn. A number of ears prepared in accordance with the foregoing steps are placed on a tray or other suitable receptacle in a dehydrating oven. The oven preferably has an initial temperature in the vicinity of 500° F. The introduction of the ears of corn into the oven will cause the oven temperature to drop, such drop being possibly as much as 100° and depending largely upon the quantity and temperature of the ears placed in the oven. The ears of corn in the receptacle remain in the oven a sufficient time to cause a substantial amount of moisture of the cob to be evaporated or driven from the cut ends of the cob until the cob is appreciably dehydrated from its original condition. While the exact physical and/or chemical processes taking place within the ears and particularly the cobs while in the oven is not known, it is believed that the removal of at least a substantial amount of moisture from the cobs as aforesaid results in the natural sweet flavor of the roasted fresh product not being contaminated by flavor from the cob after said roasted product is frozen and subsequently prepared for eating in accordance with the steps of the present process described hereinafter.

The length of time during which the ears of corn remain in the oven will depend upon the size of the oven in comparison with the volume of corn introduced therein, and the size of the cobs of ears placed within the oven. Ears having relatively large cobs will be retained in the oven a longer period of time than ears of corn having relatively smaller cobs. The dehydration of the cobs takes place without appreciably dehydrating the kernels of corn on the cobs since said kernels remain enclosed within the layers of husk leaves referred to above.

In general practice it has been found that ears of corn having average size cobs will be satisfactorily roasted when retained within an oven at temperatures between 400° F. and 500° F. for a period approximating one hour in time.

When the ears of corn have been roasted to an extent determined by previous experience so that the cobs have been dehydrated the desired amount, the roasted ears of corn are removed from the oven and are immediately husked. The corn silk is also removed from the ears and the husked and desilked ears are immediately immersed in cold water having a temperature approaching freezing. The roasted ears, while in the water bath, are thus quickly cooled and are substantially sealed against contact with atmospheric air. After a quantity of ears have been thus treated in the bath, they are removed from the water bath and quickly drained.

For best marketing results, ears of corn sold for consumption while on the cob should preferably be in substantially perfect condition. That is, if the variety of corn is such that straight rows of kernels are inherent to the product, ears have the most pleasing appearance with straight rows of kernels, as well as full ears, are considered select ears. At this part of the present process, such select ears are quickly separated from those ears which, for example, may have crooked rows of kernels or are not completely filled out during the natural growth of the corn. The select ears are then quickly placed in either individual containers or two or more ears are placed in a single container. Such containers may be formed from a number of different kinds of material of which sheet-type regenerated cellulose has been found satisfactory. One such type of product is sold under the trade name "cellophane" and the preferred type of said regenerated cellulose material is moisture-proof. After the aforementioned select ears are placed in the containers as aforesaid, they are quickly frozen in a sub-zero atmosphere.

The imperfect ears which have been separated from the aforementioned select ears have the corn kernels quickly sliced or cut therefrom in accordance with the present process and a desired, measured quantity of cut kernels are placed in a container made from material similar to that in which the select ears are placed. If desired, said containers may be placed in suitable boxes made from cardboard or otherwise and in which the cut kernels are merchandized. Such packaged kernels of corn are then quickly frozen in a sub-zero atmosphere.

After being frozen, the packaged ears or kernels are stored in a freezing atmosphere until they are to be eaten. When the ears of corn or corn kernels prepared in accordance with the foregoing process are to be prepared for eating, the packaged products are first defrosted by removing the packaged products from freezing atmosphere and putting them for example, in a room temperature atmosphere. The defrosting of the packaged kernels continues until the kernels can conveniently be removed from the bags within which they have been frozen. The cut kernels may then be placed in boiling water and heated by boiling for a few minutes, after which they are in condition to be eaten. The frozen ears of corn may be prepared for eating by being placed, while in their containers, in a moderate temperature oven for a few minutes. The ears and containers are then rotated approximately 180° and heated for another period of a few minutes. Preferably, the ears while still in the containers are again rotated back to their original position within the oven and heated for a few minutes more. The ears may then be removed from the containers and heated for a few minutes more and they are then ready for consumption.

The foregoing process produces roasted ears of fresh corn which retain substantially all of the natural flavor and sweetness of fresh sweet corn roasted at the height of its sweetness and ripeness, even though the product has been retained in a frozen atmosphere for a relatively long period of time comprising a number of months. The product may be preserved while on the cob or sliced or cut from the cob and said product may be quickly prepared for eating from the frozen state thereof. When prepared for eating, the product has substantially all of the crispness and natural sweet flavor of freshly roasted fully ripened corn.

While the invention has been illustrated and described in its preferred embodiment and has included certain details, it should be understood that the invention is not to be limited to the precise details herein illustrated and described since the same may be carried out in other ways, falling within the scope of the invention as claimed.

I claim as my invention:

1. The process of preserving fresh corn which comprises cutting the ends from freshly picked unhusked ears of corn to expose the ends of the cobs, roasting said ears with husk leaves thereon at a temperature sufficient to at least partially dehydrate said cobs while said husks prevent appreciable dehydration of the kernels of said ears, removing said husk leaves from the roasted ears, freezing said roasted corn, and retaining said corn in a frozen condition until ready for use.

2. The process of preserving fresh corn which comprises cutting ends from freshly picked unhusked ears of corn to expose the ends of the cobs, roasting said ears with husk leaves thereon in an enclosed atmosphere having a temperature between 400° F. and 500° F., whereby the cobs are dehydrated an appreciable amount from their original natural condition and said husks prevent appreciable dehydration of the kernels of said ears, removing said husks from the roasted ears, freezing said roasted corn and retaining said corn in a frozen condition until ready for use.

3. The process of preserving fresh corn on the cob which comprises cutting the ends from freshly picked unhusked ears of corn to expose the interior of the ends of the cobs, roasting said ears with the husks thereon at a temperature sufficient to at least partially dehydrate said cobs while said husks prevent appreciable dehydration of the kernels of said ears, removing said husks from the roasted ears, quickly and substantially reducing the temperature of said roasted ears, enclosing said ears in moisture-proof containers, freezing said roasted ears while in said containers, and retaining said ears in said frozen condition until ready for use.

4. The process of preserving fresh corn on the cob which comprises cutting ends from freshly picked ears of unhusked corn to expose the interior of the ends of the cobs, removing part of the external husk leaves on each ear, roasting said ears while enclosed within the remaining husk leaves at a temperature sufficient to at least partially dehydrate said cobs while said husks prevent appreciable dehydration of the kernels of said ears, removing said remaining husk leaves from the roasted ears, immersing said roasted ears in a cooling medium to reduce the temperature thereof quickly, enclosing said cooled roasted ears within substantially moisture-proof containers, freezing said roasted corn, and retaining said ears in a frozen condition until ready for use.

5. The process of preserving fresh corn on the cob which comprises cutting the ends from freshly picked unhusked ears of corn to expose the ends of the cobs, removing part of the external husk leaves on each ear, roasting said ears while enclosed within the remaining husk leaves at a temperature sufficient to at least partially dehydrate said cobs while said husks prevent appreciable dehydration of the kernels on said ears, removing said remaining husk leaves from the roasted ears, immediately thereafter immersing said dehusked roasted ears in a water bath having a temperature approaching freezing, removing said roasted ears from said bath and draining the same, enclosing said roasted corn within substantially moisture-proof containers, freezing said roasted ears of corn, and retaining said ears of corn in a frozen condition until ready for use.

6. The process of preserving fresh corn which comprises cutting ends from freshly picked ears of corn to expose the interior of the ends of the cobs, roasting said ears with the husk leaves thereon at a temperature sufficient to at least partially dehydrate said cobs while said husks prevent appreciable dehydration of the kernels on said ears, removing said husk leaves from the roasted ears, immediately thereafter immersing the dehusked ears in a water bath having a temperature approaching freezing, removing said roasted ears from said bath and draining the same, cutting the roasted kernels from the cobs, enclosing said cut roasted kernels in moisture-proof containers, freezing said containers of roasted corn kernels, and retaining said containers of corn kernels in a frozen condition until ready for use.

EDGAR T. BOISVERT.

REFERENCES CITED

The following references are of record in the file of this patent:

UNITED STATES PATENTS

| Number | Name | Date |
|---|---|---|
| 1,247,261 | Goodrich | Nov. 20, 1917 |
| 1,668,903 | Haslacher | May 8, 1928 |